United States Patent
Teramoto

(10) Patent No.: US 12,070,891 B2
(45) Date of Patent: Aug. 27, 2024

(54) THERMOFORMING DEVICE AND THERMOFORMING METHOD

(71) Applicant: Asano Laboratories Co., Ltd., Aichi (JP)

(72) Inventor: Kazunori Teramoto, Aichi-gun (JP)

(73) Assignee: Asano Laboratories Co., Ltd., Aichi (JP)

(*) Notice: Subject to any disclaimer, the term of this patent is extended or adjusted under 35 U.S.C. 154(b) by 202 days.

(21) Appl. No.: 17/565,860

(22) Filed: Dec. 30, 2021

(65) Prior Publication Data

US 2022/0118675 A1  Apr. 21, 2022

Related U.S. Application Data

(62) Division of application No. 15/579,987, filed as application No. PCT/JP2016/066767 on Jun. 6, 2016, now abandoned.

(30) Foreign Application Priority Data

Jun. 8, 2015  (JP) .................................. 2015-115982

(51) Int. Cl.
*B29C 51/26* (2006.01)
*B29C 51/02* (2006.01)
(Continued)

(52) U.S. Cl.
CPC ............ *B29C 51/262* (2013.01); *B29C 51/02* (2013.01); *B29C 51/12* (2013.01); *B29C 51/165* (2013.01);
(Continued)

(58) Field of Classification Search
None
See application file for complete search history.

(56) References Cited

U.S. PATENT DOCUMENTS

| 4,462,786 A | 7/1984 | Perryman |
| 2011/0094195 A1 | 4/2011 | Bartoli et al. |

(Continued)

FOREIGN PATENT DOCUMENTS

| CN | 102762358 A | 10/2012 |
| JP | S53112966 A | 10/1978 |

(Continued)

OTHER PUBLICATIONS

U.S. Patent and Trademark Office, Restriction Requirement issued in U.S. Appl. No. 15/579,987 mailed on Sep. 12, 2019.
(Continued)

*Primary Examiner* — Jacob T Minskey
*Assistant Examiner* — Adrianna N Konves
(74) *Attorney, Agent, or Firm* — Wood Herron & Evans LLP

(57) ABSTRACT

A thermoforming device includes: a base configured to hold a substrate; a hot plate including a heating surface facing vertically downward; a sheet transport portion that supplies a sheet onto the heating surface of the hot plate; and a substrate supply portion configured to attach the substrate to the base and detach the substrate from the base, and to dispose the substrate at a substrate supply position positioned in a lower area of the sheet which is opposite to a side of the sheet in which the heating surface is provided. In the thermoforming device, heating of the sheet using the hot plate and attachment and detachment of the substrate with respect to the base are performable at the same time, and the sheet heated and softened by the hot plate is attached to the substrate at the substrate supply position.

7 Claims, 15 Drawing Sheets

(51) Int. Cl.
- B29C 51/12 (2006.01)
- B29C 51/16 (2006.01)
- B29C 51/42 (2006.01)
- B29C 51/10 (2006.01)
- B29C 51/14 (2006.01)
- B29K 23/00 (2006.01)
- B29L 31/50 (2006.01)

(52) U.S. Cl.
CPC .......... *B29C 51/167* (2013.01); *B29C 51/261* (2013.01); *B29C 51/264* (2013.01); *B29C 51/425* (2013.01); *B29C 51/10* (2013.01); *B29C 51/14* (2013.01); *B29C 2791/006* (2013.01); *B29C 2793/0081* (2013.01); *B29K 2023/06* (2013.01); *B29K 2023/12* (2013.01); *B29L 2031/50* (2013.01)

(56) References Cited

U.S. PATENT DOCUMENTS

| | | |
|---|---|---|
| 2012/0211928 A1 | 8/2012 | Takai et al. |
| 2013/0193616 A1 | 8/2013 | Bartoli et al. |
| 2013/0292041 A1 | 11/2013 | Mizoguchi et al. |
| 2015/0202852 A1 | 7/2015 | Miyagawa et al. |

FOREIGN PATENT DOCUMENTS

| | | |
|---|---|---|
| JP | 104147826 A | 5/1992 |
| JP | H05050497 A | 3/1993 |
| JP | H06143329 A | 5/1994 |
| JP | 3102916 B2 | 10/2000 |
| JP | 2004050423 A | 2/2004 |
| JP | 2011051227 A | 3/2011 |
| JP | 2014108562 A | 6/2014 |
| JP | 2015057310 A | 3/2015 |
| WO | 2015022810 A1 | 2/2015 |

OTHER PUBLICATIONS

U.S. Patent and Trademark Office, Advisory Action issued in U.S. Appl. No. 15/579,987 mailed on Jun. 18, 2021.
PCT Office, International Search Report issued in PCT/JP2016/066767 mailed on Jul. 5, 2016, 3 pages.
European Patent Office, Search Report issued in corresponding EP 16807431.8 mailed on Nov. 27, 2018, 10 pages.
Japanese Patent Office, Office Action issued in JP 2015-115982 mailed on Jan. 22, 2019, 7 pages.
Chinese Patent Office, Office Action issued in CN 201680031863.2 mailed on Jan. 28, 2019, 28 pages.
U.S. Patent and Trademark Office, Office Action issued in U.S. Appl. No. 15/579,987 mailed on Dec. 5, 2019.
U.S. Patent and Trademark Office, Office Action issued in U.S. Appl. No. 15/579,987 mailed on Apr. 30, 2020.
U.S. Patent and Trademark Office, Office Action issued in U.S. Appl. No. 15/579,987 mailed on Aug. 31, 2020.
U.S. Patent and Trademark Office, Office Action issued in U.S. Appl. No. 15/579,987 mailed on Feb. 19, 2021.
U.S. Patent and Trademark Office, Office Action issued in U.S. Appl. No. 15/579,987 mailed on Oct. 1, 2021.

THERMOFORMING DEVICE AND THERMOFORMING METHOD

Priority is claimed on Japanese Patent Application No. 2015-115982, filed on Jun. 8, 2015, the content of which is incorporated herein by reference.

TECHNICAL FIELD

The present invention relates to a thermoforming device and a thermoforming method.

BACKGROUND ART

In general, as a device for attaching a surface sheet (hereinafter, referred to as "sheet") to an outer surface of a formed substrate (hereinafter, referred to as "substrate"), a vacuum press laminate forming device using radiation heating in upper and lower chambers, a thermoforming device using hot plate heating or the like is known.

For example, Patent Document 1 discloses a vacuum press laminate forming device. This vacuum press laminate forming device includes upper and lower chambers. The lower chamber (fourth chamber) accommodates a formed substrate, and a sheet can be set on a peripheral portion thereof on the upper chamber (first chamber) side. The upper chamber includes a hot plate that includes a heater on an upper side of the lower chamber. The upper chamber is connected to a vacuum tank and a pressure tank and can evacuate and pressurize the inside of a chamber which is formed by the upper and lower chambers. The lower chamber is connected to the vacuum tank and can evacuate the inside of the chamber.

In the vacuum press laminate forming device described in Patent Document 1, the lower chamber is depressurized in a state where a synthetic resin sheet is released from a substrate by depressurizing an intermediate chamber (third chamber). As a result, air present between the substrate and the synthetic resin sheet is sufficiently removed without interference with the synthetic resin sheet, and then the upper chamber is pressurized. Therefore, the synthetic resin sheet is attached to the substrate in a vacuum state with a differential pressure between the upper chamber and the lower chamber.

DOCUMENT OF RELATED ART

Patent Document

[Patent Document 1] Japanese Patent No. 3102916

SUMMARY OF INVENTION

Technical Problem

However, in the vacuum press laminate forming device described in Patent Document 1, it is necessary that, after completion of the attachment of the substrate to a base, the upper and lower chambers are closed to make inside of the chamber a vacuum state and the heating of the sheet is started. Therefore, it is necessary to take time for the attachment of the substrate to the base, and to take time for the heating of the sheet, and there is a problem in that it is difficult to reduce the cycle time. As a result, it is difficult to continuously manufacture a formed product with high efficiency.

The present invention has been made in consideration of the above-described circumstances, and an object thereof is to provide a thermoforming device and a thermoforming method capable of reducing the cycle time.

Solution to Problem

According to a first aspect of the present invention, there is provided a thermoforming device includes: a base configured to hold a substrate; a hot plate including a heating surface facing vertically downward; a sheet transport portion that supplies a sheet onto the heating surface of the hot plate; and a substrate supply portion configured to attach the substrate to the base and detach the substrate from the base, and to dispose the substrate at a substrate supply position positioned in a lower area of the sheet which is opposite to a side of the sheet in which the heating surface is provided. In the thermoforming device, heating of the sheet using the hot plate and attachment and detachment of the substrate with respect to the base are performable at the same time, and the sheet heated and softened by the hot plate is attached to the substrate at the substrate supply position.

In the thermoforming device according to the first aspect of the present invention, while the sheet which is supplied to the heating surface of the hot plate by the sheet transport portion is heated, the attachment (detachment) operation of the substrate to (from) the base can be performed. The base and the substrate are disposed at the substrate supply position by the substrate supply portion. Accordingly, the heating of the sheet, which is performed after the attachment of a substrate to a base in the related art, is performed at the same time as the attachment of the substrate, and the heating time of the sheet is included in the attachment time of the substrate to the base.

In the thermoforming device according to the first aspect, the substrate supply portion may be provided to be movable between the substrate supply position and a substrate non-supply position separated from the substrate supply position, and may attach the substrate to the base and detach the substrate from the base at the substrate non-supply position.

In the thermoforming device according to the first aspect of the present invention, even in a case where the attachment of the substrate to the base is performed at the substrate non-supply position, the substrate attached to the base is efficiently and smoothly moved to the substrate supply position by the substrate supply portion.

In the thermoforming device according to the first aspect, the sheet transport portion may be configured to continuously supply the sheet in an extending direction of the heating surface of the hot plate.

In the thermoforming device according to the first aspect, the sheet is continuously supplied to the heating surface of the hot plate by the sheet transport portion, and the supply time of the sheet is reduced as compared to a case where the sheet is supplied in a batch process.

In the thermoforming device according to the first aspect, the hot plate and the substrate disposed at the substrate supply position may be provided to be movable relative to each other in a vertical direction.

In the thermoforming device according to the first aspect, the distance between the hot plate and the substrate in the vertical direction is freely adjusted, and the detachment operation of the substrate from the base is efficiently performed.

In the thermoforming device according to the first aspect, the sheet transport portion may include a sheet support portion that unwindably supports a roll sheet wound in roll shape, a sheet unwinding portion that detachably holds a sheet end of the roll sheet wound in roll shape and is provided so as to be movable in an area between the hot plate and the substrate supply position such that the roll sheet is unwound in an extending direction of the heating surface, and a sheet cutting portion that cuts the roll sheet, which is held by the sheet unwinding portion, at an upstream position of the heating surface in an unwinding direction.

In the thermoforming device according to the first aspect, the roll sheet supported by the sheet support portion is continuously unwound to the space between the hot plate and the substrate supply position by the sheet unwinding portion, and is cut by the sheet cutting portion to have a predetermined length in the unwinding direction. By performing the continuous unwinding and cutting of the roll sheet as described above, the supply operation of the sheet using the sheet transport portion is efficiently performed.

In the thermoforming device according to the first aspect, the sheet transport portion may further include a cut sheet holding portion that holds a sheet end of the roll sheet cut by the sheet cutting portion.

In the thermoforming device according to the first aspect, the sheet end of the cut roll sheet is held by the cut sheet holding portion, and the sheet is stable without being removed from a predetermined position. Therefore, the supply operation of the sheet using the sheet transport portion is smoothly performed.

The thermoforming device according to the first aspect of the present invention may further include a sheet storage portion that stores a plurality of sheets cut into a predetermined size, in which the sheet transport portion may transport and supply the sheets one by one from the sheet storage portion to the heating surface of the hot plate.

In the thermoforming device according to the first aspect, even in a case where the sheet is cut in a predetermined size and the cut sheets are supplied one by one to the heating surface of the hot plate in a batch process, the sheets are substantially automatically and sequentially supplied to the heating surface of the hot plate by the sheet transport portion. Therefore, as in the case where the roll sheet is used, the supply operation of the sheet using the sheet transport portion is efficiently performed.

According to a second aspect of the present invention, there is provided a thermoforming method in which a thermoforming device is used, the thermoforming device including: a base configured to hold a substrate; a hot plate including a heating surface facing vertically downward; a sheet transport portion that supplies a sheet onto the heating surface of the hot plate; and a substrate supply portion configured to attach the substrate to the base and detach the substrate from the base and to dispose the substrate at a substrate supply position positioned in a lower area which is opposite to a side of the sheet in which the heating surface is provided. This thermoforming method includes: attaching the substrate to the base and disposing the base at the substrate supply position; supplying the sheet to an area between the heating surface of the hot plate and the substrate supply position by the sheet transport portion; heating the sheet by the hot plate; causing a frame, which accommodates the base and the substrate, to be relatively close to the hot plate and to come into contact with the hot plate through the sheet; depressurizing the inside of a closed space enclosed by the sheet and the frame, and mold-shaping the sheet or attaching the sheet to the substrate; wherein attaching of the substrate and heating of the sheet are performed at the same time.

In the thermoforming method according to the second aspect, while the sheet which is supplied to the heating surface of the hot plate by the sheet transport portion is heated, the attachment of the substrate to (detachment of the substrate from) the base can be completed. The base and the substrate can be disposed at the substrate supply position by the substrate supply portion. Accordingly, the heating time of the sheet can be included in the time of the attachment of the substrate to the base, and it is not necessary to separately secure the heating time of the sheet.

Effects of Invention

By using the thermoforming device and the thermoforming method according to the respective aspects of the present invention, the cycle time can be reduced.

DESCRIPTION OF EMBODIMENTS

Figure 1:
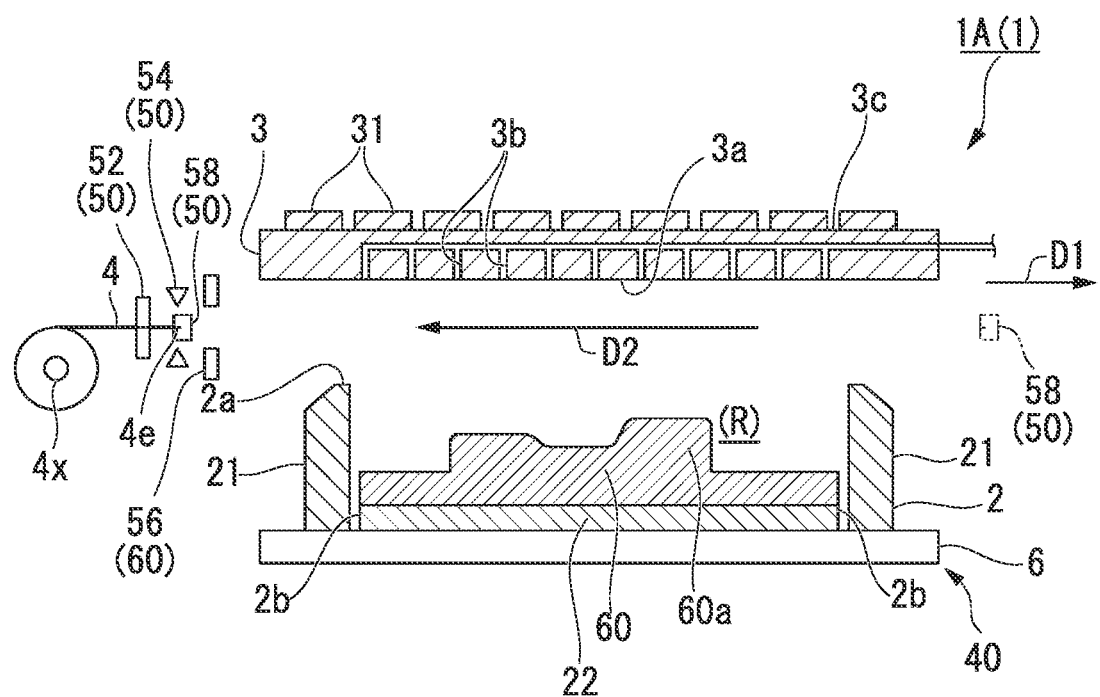
FIG. 1 is a longitudinal sectional view showing a configuration of a thermoforming device according to a first embodiment of the present invention.

Hereinafter, a thermoforming device and a thermoforming method according to each of embodiments of the present invention will be described with reference to the drawings. The drawings used in the following description are merely schematic, in which, for example, ratios between the lengths, the widths, and the thicknesses are necessarily the same as the real ones and can be appropriately changed.

A thermoforming device 1 according to each of the embodiments of the present invention is a hot plate heating type and includes a base 22 and a hot plate 3 having a heating surface 3a that heats a sheet 4. In the thermoforming device 1, a substrate 10 held by the base 22 is covered with the sheet 4 which is heated and softened by the hot plate 3 (refer to FIG. 1).

Hereinafter, thermoforming devices 1A to 1C according to the embodiments of the present invention will be described. In the description common to the respective embodiments, the thermoforming devices 1A, 1B, and 1C will be collectively referred to as "thermoforming device 1" without distinguishing them from each other.

First Embodiment

Hereinafter, a thermoforming device according to a first embodiment of the present invention will be described.
[Configuration of Thermoforming Device 1A]

Figure 2:
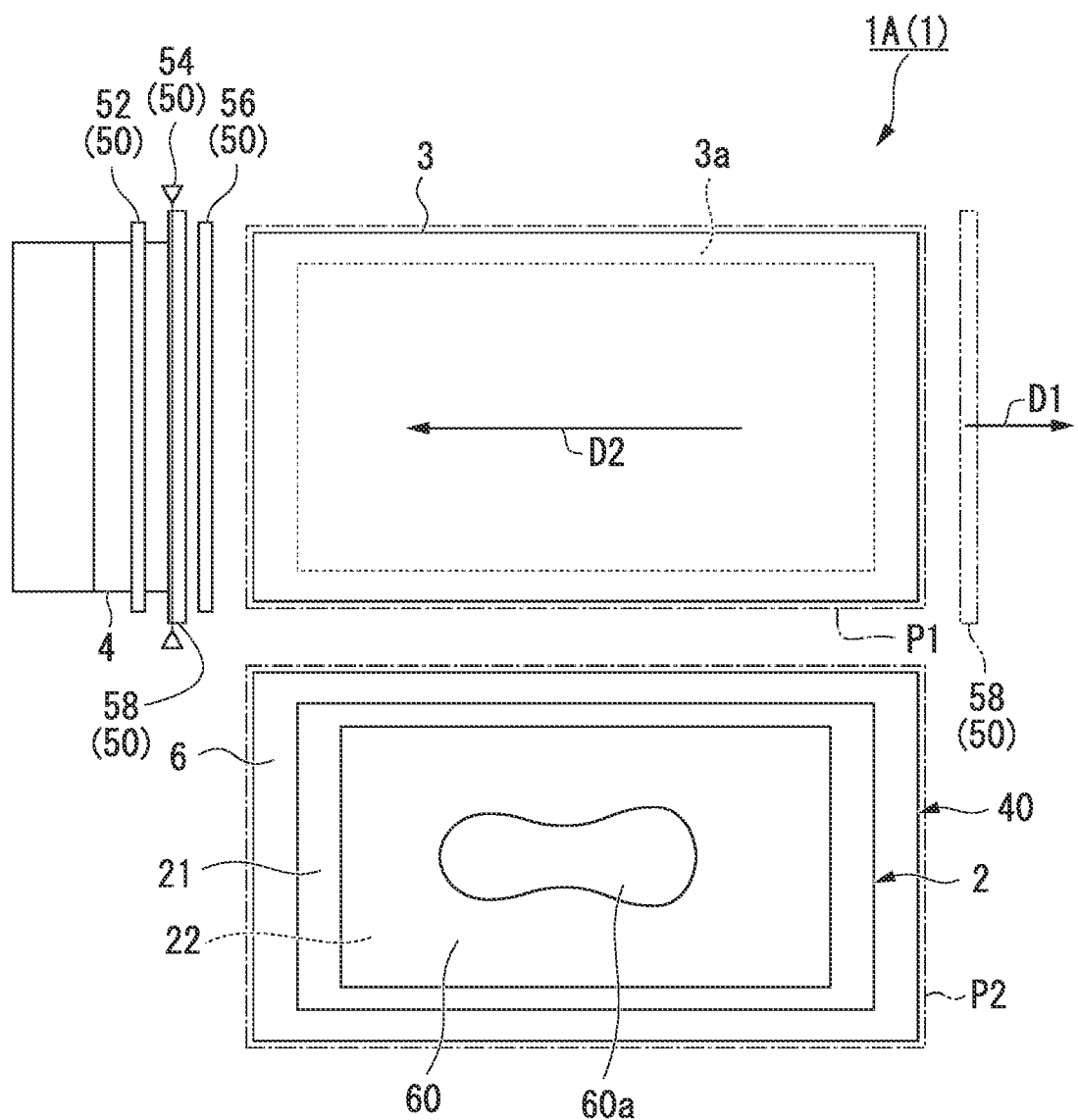
FIG. 2 is a plan view showing the configuration of the thermoforming device according to the first embodiment of the present invention.

FIG. 1 is a longitudinal sectional view showing a configuration of a thermoforming device 1A according to the first embodiment of the present invention. FIG. 2 is a plan view showing the configuration of the thermoforming device 1A.

As shown in FIG. 1, the thermoforming device 1 includes the hot plate 3, a sheet transport portion 50, and a substrate supply portion 40.

The hot plate 3 is a component for heating and softening the sheet 4, and has the heating surface 3a. The heating surface 3a is a smooth plane, and the hot plate 3 has a flat plate shape in which the heating surface 3a is the bottom surface.

The hot plate 3 is provided so as to rise and fall in a direction toward or away from a substrate supply position P1 (refer to FIG. 2) which is positioned below the hot plate 3. In addition, the hot plate 3 is configured to be disposed to closely contact to a frame upper edge portion 2a of a lower frame 2 of the substrate supply portion 40 in a state where the hot plate 3 is moved to a lower side.

On an upper surface 3c of the hot plate 3, a plurality of heaters 31, . . . , and 31 are provided at predetermined intervals.

On the heating surface 3a of the hot plate 3, a plurality of air holes 3b, . . . , and 3b which open to the heating surface 3a are formed at predetermined intervals. Each of the air holes 3b is connected to a vacuum pump (not shown) which sucks the heating surface 3a side, and a pressure pump (not shown) which stores compressed air using a compressor. This way, by providing the vacuum tank, a loss of depressurization in the thermoforming device 1 is reduced.

The sheet 4 is a well-known multi-layer sheet including a printed layer, a protective film or a carrier film (not shown) that is provided on a surface of the printed layer, and an adhesive layer that is provided on a back surface of the printed layer. A material of the sheet 4 is heated and formed by a heating element 71 and can be solidified when cooled.

The sheet 4 according to the embodiment is a roll sheet wound in a roll shape (hereinafter, also simply referred to as "sheet").

The substrate 10 is a target to be covered with the sheet 4 and attach the sheet 4 thereto, and the substrate 10 is a main body of a formed product which is formed of a thermoplastic resin such as a polypropylene resin or a polyethylene resin. However, a material of the substrate 10 is not limited to the above-described resins.

In order to supply the sheet 4 to the heating surface 3a of the hot plate 3, the sheet transport portion 50 includes, for example, a sheet support portion 52, a sheet unwinding portion, a sheet cutting portion, and a cut sheet holding portion 56.

In order to unwindably support the sheet 4, the sheet support portion 52 includes a member (not shown) that supports a core 4x of the sheet 4 and a support member that supports the sheet 4 at a position where the unwinding of the sheet 4 starts.

Regarding the support member of the sheet support portion 52, the sheet 4 may pass through the support member along an unwinding direction D1 of the sheet 4 (hereinafter, simply referred to as "unwinding direction D1") which matches with an extending direction of the heating surface 3a of the hot plate 3 as shown in FIG. 1, or the sheet 4 may be simply placed on the support member.

The sheet unwinding portion 58 detachably holds a sheet end 4e of the sheet 4 and unwinds the sheet 4 to the lower side of the heating surface 3a of the hot plate 3 along the unwinding direction D1. The sheet unwinding portion 58 includes a member that is provided to be movable along the unwinding direction D1 and a return direction D2 opposite to the unwinding direction D1. Therefore, the sheet unwinding portion 58 can freely reciprocate between a position indicated by a solid line in FIG. 1 and a position indicated by a two-dot chain line in FIG. 1.

The sheet cutting portion 54 cuts the sheet 4, which is held by the sheet unwinding portion 58, at an upstream position of the heating surface 3a of the hot plate 3 in the unwinding direction D1. The sheet cutting portion 54 may be, for example, a cutter which extends in the width direction of the roll sheet, or a cutter which can perform scanning in a direction parallel to the width direction of the roll sheet. In addition, the cutter may rise and fall in a direction toward or away from the sheet 4.

Figure 6:
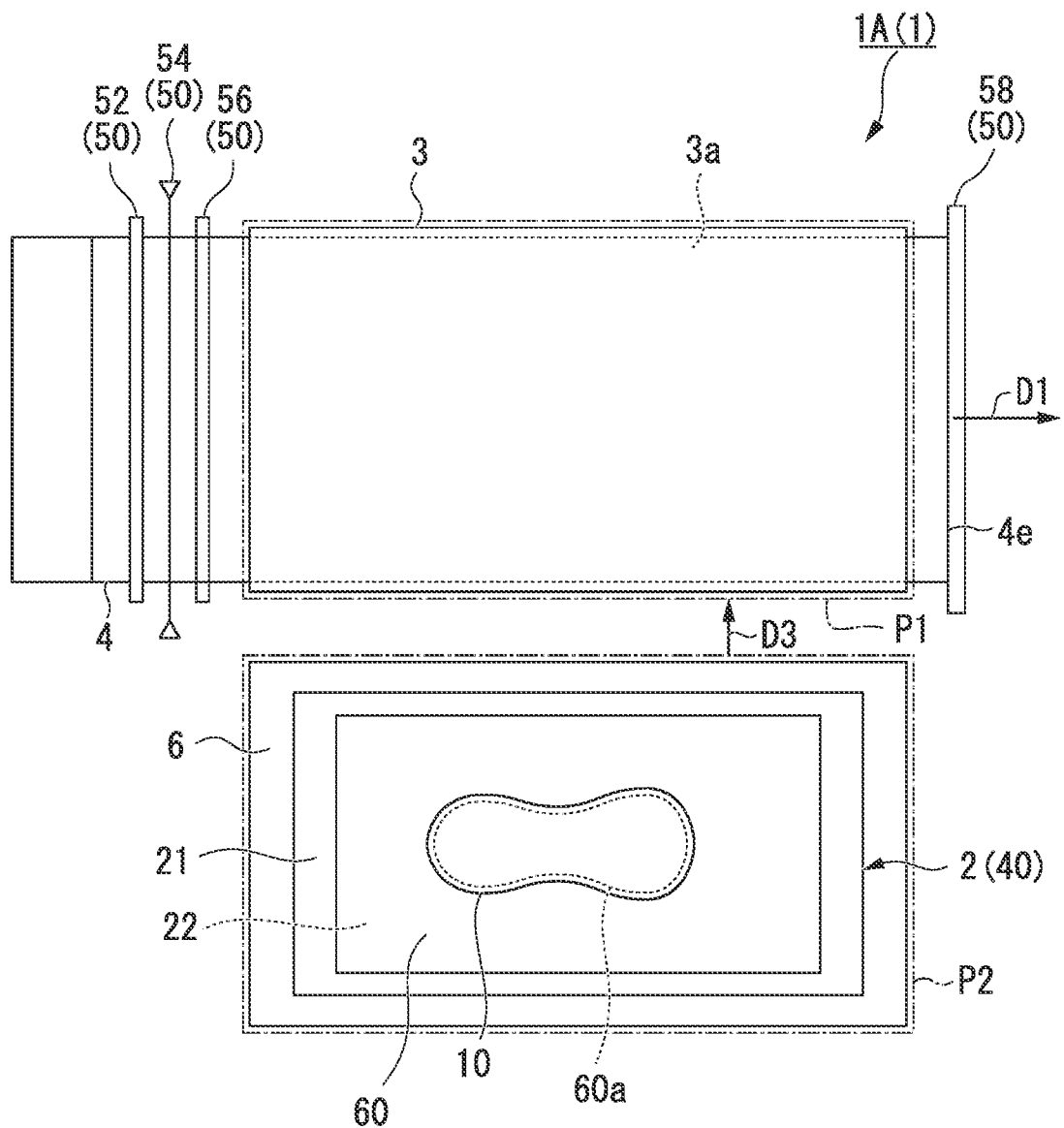
FIG. 6 is a plan view showing the thermoforming method in which the thermoforming device according to the first embodiment of the present invention is used.
Figure 7:
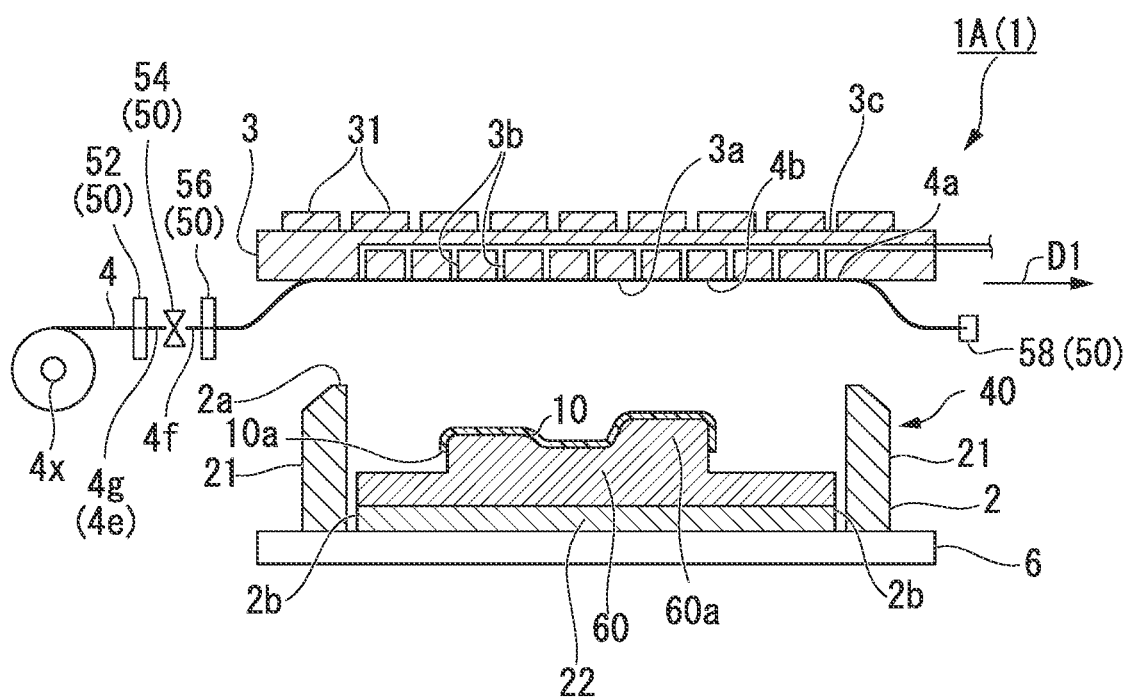
FIG. 7 is a longitudinal sectional view showing the thermoforming method in which the thermoforming device according to the first embodiment of the present invention is used.

The cut sheet holding portion 56 holds the sheet end 4e of the sheet 4 cut by the sheet cutting portion 54 (refer to FIGS. 6 and 7). The cut sheet holding portion 56 is configured of, for example, a member which can rise and fall in a direction toward or away from the sheet 4.

The sheet transport portion 50 includes, for example, the above-described components, and the sheet unwinding portion 58 can sequentially unwound the sheet 4 along the unwinding direction D1 of the sheet 4, and sheet transport portion 50 can continuously supply the sheet 4 along the extending direction of the heating surface 3a while the sheet cutting portion 54 cut the sheet 4.

The substrate supply portion 40 includes at least the base 22 and is provided so as to attach the substrate 10 to the base 22 and detach the substrate 10 (not shown in FIG. 1) from the base 22, and to dispose the substrate 10 at the substrate supply position P1 which is positioned below the heating surface 3a of the hot plate 3 with the sheet 4 interposed therebetween. That is, the substrate supply position P1 is positioned in a lower area of the sheet which is opposite to a side of the sheet where the heating surface is provided. The substrate supply portion 40 includes a lower frame 2 as a configuration for disposing the substrate 10 as described above.

The lower frame 2 is a member formed of metal such as stainless steel and includes the base 22 and a peripheral wall portion 21.

The base 22 is formed in a smaller shape than the hot plate 3 in a plan view and is provided on a stand 6. The stand 6 is slidable on a floor and is provided so as to be movable between the substrate supply position P1 and a substrate non-supply position P2 (refer to FIG. 2) which is separated from the substrate supply position P1 in a plan view shown in FIG. 2.

The substrate non-supply position P2 is not particularly limited as long as it is an arbitrary position which is separated from the substrate supply position P1 in a plan view and where the substrate 10 is attachable to the base 22 and detachable from the base 22 in the lower frame 2. That is, the lower frame 2 positioned at the substrate supply position P1 may overlap the lower frame 2 positioned at the substrate non-supply position P2.

In addition, the stand 6 is not necessarily provided. A position where the base 22 is attached and a configuration of the base 22 are not particularly limited as long as the base 22 is movable as described above.

Due to the above-described configuration, as shown in FIG. 2, the substrate supply portion 40 is movably provided.

The peripheral wall portion 21 is vertically provided on an outer peripheral side of the base 22.

In an accommodation space R surrounded by the base 22 and the peripheral wall portion 21, a substrate jig 60 is accommodated.

A plurality of air holes 2b, . . . , and 2b which are connected to the accommodation space R are formed between the base 22, which is the bottom of the accommodation space R, and the peripheral wall portion 21. Each of the air holes 2b is connected to a vacuum pump (not shown). During forming, the vacuum pump operates such that the accommodation space R is depressurized through a suction operation.

Figure 3:
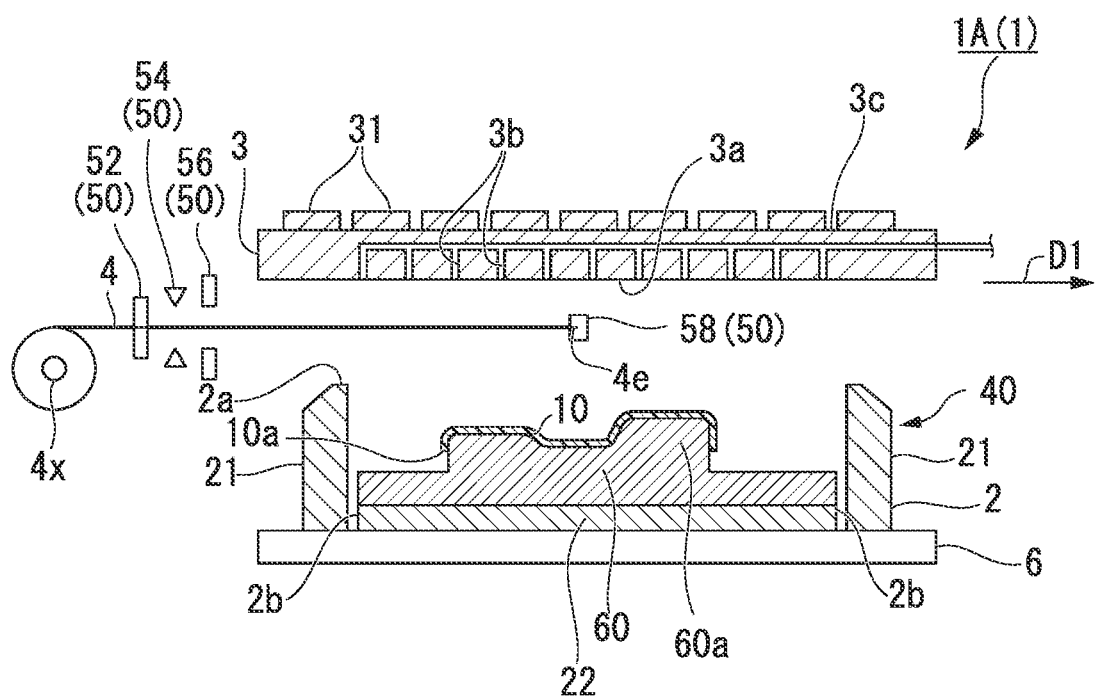
FIG. 3 is a longitudinal sectional view showing a thermoforming method in which the thermoforming device according to the first embodiment of the present invention is used.

The substrate jig 60 is provided on the base 22, is formed of, for example, metal, and includes a protrusion 60a at upper portion of the substrate jig 60. The protrusion 60a is configured such that the substrate 10 formed of a resin or the like is deposited and held thereon. In FIG. 3, the protrusion 60a has a concave portion at the center of an upper surface thereof. The protrusion 60a does not necessarily have the concave portion.

Figure 4:
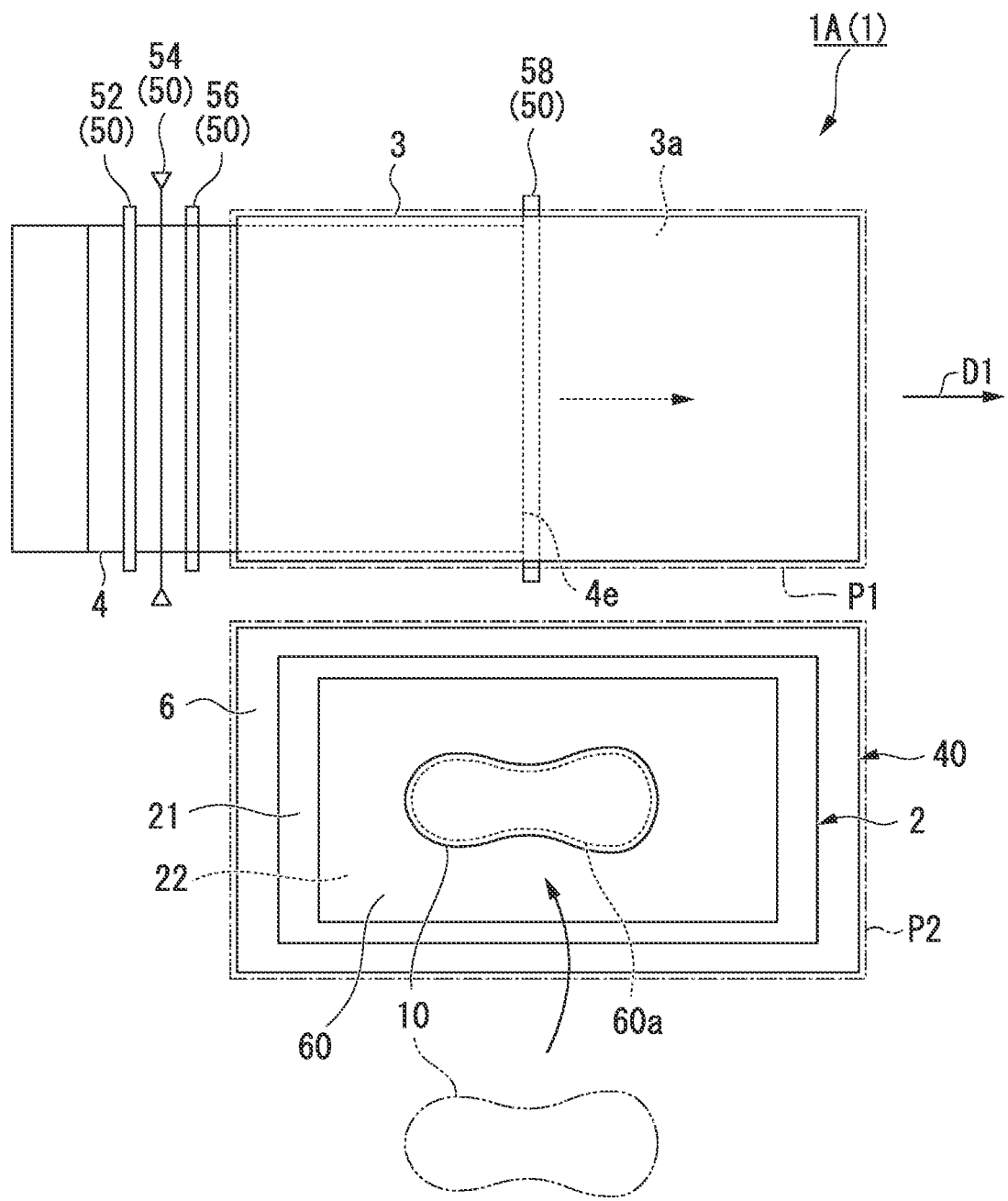
FIG. 4 is a plan view showing the thermoforming method in which the thermoforming device according to the first embodiment of the present invention is used.

In the embodiment, the protrusion 60a of the substrate jig 60 is formed in a smaller shape than the substrate 10 in a plan view (refer to FIG. 4). Therefore, the substrate 10 can be held by the substrate jig 60 in a state where an outer peripheral portion of the substrate 10 extends to the outside of a side peripheral surface of the protrusion 60a of the substrate jig 60 and covers the side peripheral surface of the protrusion 60a of the substrate jig 60. That is, the substrate jig 60 is disposed and formed such that the side peripheral surface of the protrusion 60a of the substrate jig 60 is positioned inside an outer peripheral surface of the substrate 10.

Further, the substrate jig 60 is configured such that, by a pressure tank (not shown) or the like introducing compressed air into the accommodation space R, the substrate jig 60 is pressed by the introduced compressed air and falls to the base 22 side, while maintaining a state where the sheet 4 covers and is attached to the substrate 10.

[Thermoforming Method in which Thermoforming Device 1A is Used]

Next, a thermoforming method in which the thermoforming device 1A is used will be described. The thermoforming method in which the thermoforming device 1A is used includes at least first to fifth steps and further includes a sixth step.

A state where the components are disposed at the positions shown in FIGS. 1 and 2 is set as an initial state.

<First Step (I)>

In this step, the substrate 10 is attached to the base 22.

FIGS. 3 and 4 are a longitudinal sectional view and a plan view, respectively, showing the thermoforming method in which the thermoforming device 1A is used, and show a state where the substrate 10 is attached to the base 22 and a state where the sheet transport portion 50 supplies the sheet 4 to an area between the heating surface 3a of the hot plate 3 and the substrate supply position P1.

As shown in FIGS. 3 and 4, first, the substrate 10 is attached to the substrate jig 60 disposed on the base 22 of the lower frame 2. As a result, the substrate 10 is deposited on the substrate jig 60 and held thereon.

<Second Step>

In this step, the sheet transport portion 50 supplies the sheet 4 to the area between the heating surface 3a of the hot plate 3 and the substrate supply position P1.

Substantially at the same time as the start of the first step, the sheet end 4e of the sheet 4 is held by the sheet unwinding portion 58 which is moved in advance to an upstream position in the unwinding direction D1. Next, as shown in FIGS. 3 and 4, the sheet unwinding portion 58, which holds the sheet end 4e, moves along the unwinding direction D1 to a downstream position of the heating surface 3a of the hot plate 3 in the unwinding direction D1.

After the movement of the sheet unwinding portion 58 to the downstream position of the heating surface 3a in the unwinding direction D1 is completed, the sheet 4 is laid between the heating surface 3a of the hot plate 3 and the substrate supply position P1.

<First Step (II)>

In this step, the base 22 is disposed at the substrate supply position P1.

Figure 5:
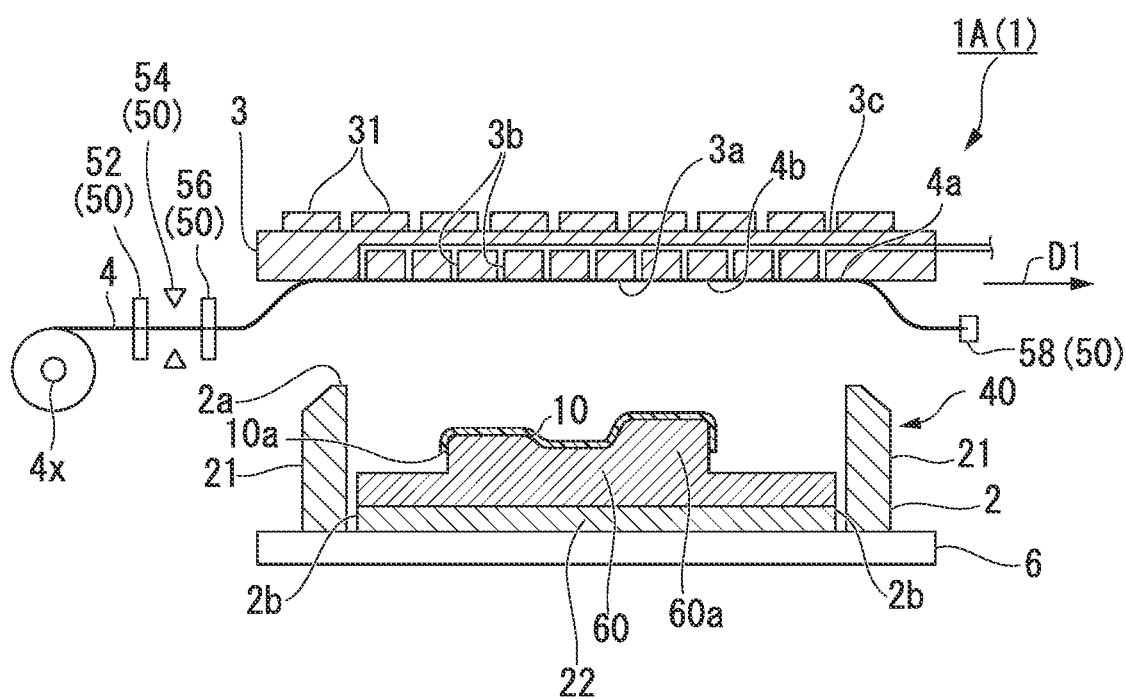
FIG. 5 is a longitudinal sectional view showing the thermoforming method in which the thermoforming device according to the first embodiment of the present invention is used.

FIGS. 5 and 6 are a longitudinal sectional view and a plan view, respectively, showing the thermoforming method in which the thermoforming device 1A is used, and show a state where the base 22 is moved to the substrate supply position P1 and a state where the sheet 4 is adsorbed on the heating surface 3a by the hot plate 3.

As shown in FIGS. 5 and 6, in a state where the substrate 10 is deposited on the substrate jig 60, the stand 6 is moved in a direction toward the hot plate 3 in a plan view (that is, a horizontal direction indicated by arrow D3) and is disposed to overlap the hot plate 3 in a plan view. As a result, the base 22 and the substrate 10 are disposed at the substrate supply position P1 positioned below the hot plate 3 (refer to FIG. 8).

In the thermoforming method in which the thermoforming device 1A is used, at least a third step described below is performed at the same time as the above-described first steps (I) and (II). The time required for the first step (I) is comparatively longer than the time required for the first step (II) or the second step. Therefore, the second step and the third step may be simultaneously performed at the same time as the first step (I).

[Third Step]

In this step, the sheet 4 is heated by the hot plate 3.

As shown in FIGS. 5 and 6, the space between the hot plate 3 and the sheet 4 is depressurized, the sheet 4 is adsorbed on the heating surface 3a and heated.

Specifically, the hot plate 3 is heated by the heater 31, and concurrently the above-described vacuum pump is operated such that the sheet 4 is sucked through the air holes 3b in a direction moving to the heating surface 3a side of the hot plate 3. As a result, the sheet 4 can be adsorbed on the heating surface 3a of the hot plate 3, and the adsorbed sheet 4 can be heated.

<Fourth Step>

In this step, the lower frame (frame) 2, which accommodates the base 22 and the substrate 10, is moved to be relatively close to the hot plate 3 and to come into contact with the sheet 4 and the hot plate 3.

In the thermoforming method in which the thermoforming device 1A is used, the hot plate 3 is moved to the lower side such that an outer peripheral portion of the heating surface 3a closely contacts to the frame upper edge portion 2a of the lower frame 2 through the sheet 4. At this time, the sheet 4 is disposed in a state where the entire upper surface thereof is substantially in contact with the heating surface 3a of the hot plate 3. As a result, an outer peripheral portion of the sheet 4 is interposed between the lower frame 2 and the hot plate 3. In addition, by closing an opening of the lower frame 2, a closed space S is formed, and the sheet 4 closely contacts to the frame upper edge portion 2a of the peripheral wall portion 21 of the lower frame 2 (refer to FIG. 9).

In this case, the lower frame 2 only has to become relatively close to the hot plate 3. For example, a position of the hot plate 3 may be fixed and the substrate supply portion 40 including the lower frame 2 may be caused to rise and fall relative to the hot plate 3.

Figure 8:
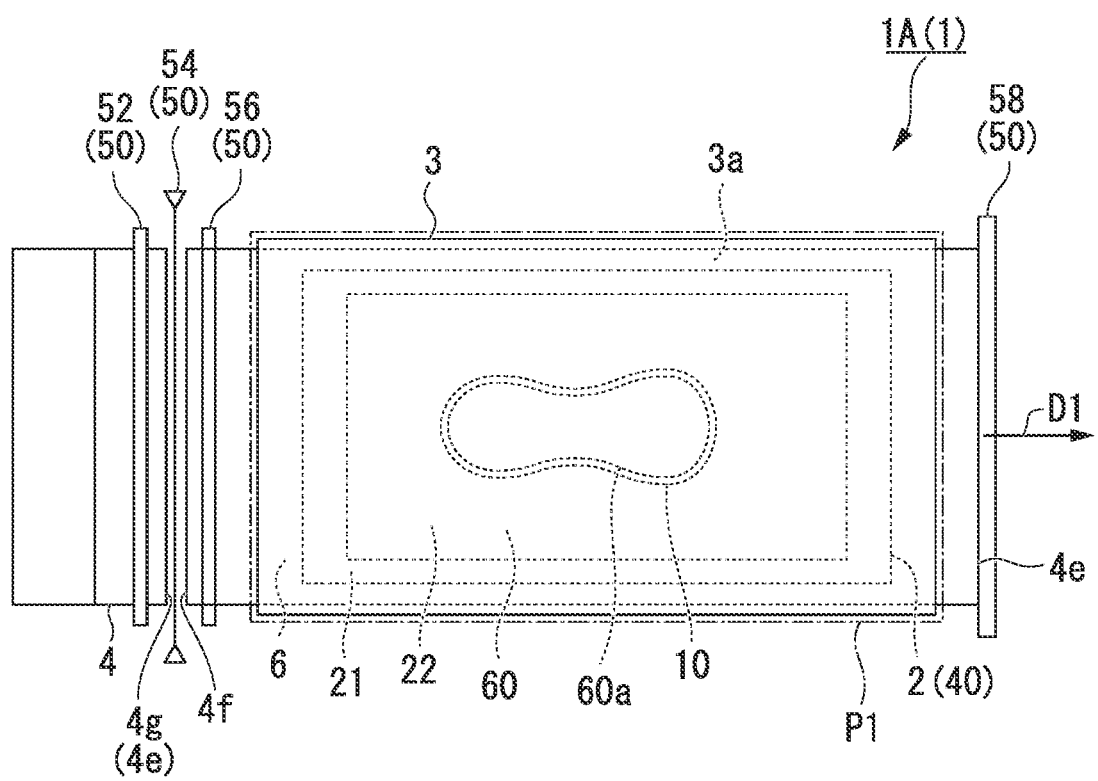
FIG. 8 is a plan view showing the thermoforming method in which the thermoforming device according to the first embodiment of the present invention is used.

FIGS. 7 and 8 are a longitudinal sectional view and a plan view, respectively, showing the thermoforming method in which the thermoforming device 1A is used, and show a state where the sheet 4 is cut while being adsorbed on the heating surface 3a by the hot plate 3.

In a period from the start of the third step to the end of the fourth step, as shown in FIGS. 7 and 8, the sheet 4 which is wound in advance is cut in a size which is enough to cover and to be attached to the substrate 10.

Specifically, the sheet 4 is cut by the sheet cutting portion 54 at an upstream position of the heating surface 3a of the hot plate 3 in the unwinding direction of the sheet 4, that is, at a position between the support member of the sheet support portion 52 and the cut sheet holding portion 56. Before and after the cutting of the sheet 4, the sheet 4 is also held by the cut sheet holding portion 56. This way, the sheet 4 is held by both the support member of the sheet support portion 52 and the cut sheet holding portion 56. As a result, after the cutting of the sheet 4, a sheet end 4f is held by the cut sheet holding portion 56, and a sheet end 4g is supported by the support member of the sheet support portion 52.

Therefore, at the upstream position of the heating surface 3a of the hot plate 3 in the unwinding direction D1, a situation such as the falling and removal of the sheet end 4f and 4g of the sheet 4 from the thermoforming device 1A or the adhesion of the sheet 4 to the stand 6 can be avoided.

<Fifth Step>

In this step, the inside of the closed space S surrounded by the sheet 4 and the lower frame 2 is depressurized, and the sheet 4 covers a surface of the substrate 10.

Figure 9:
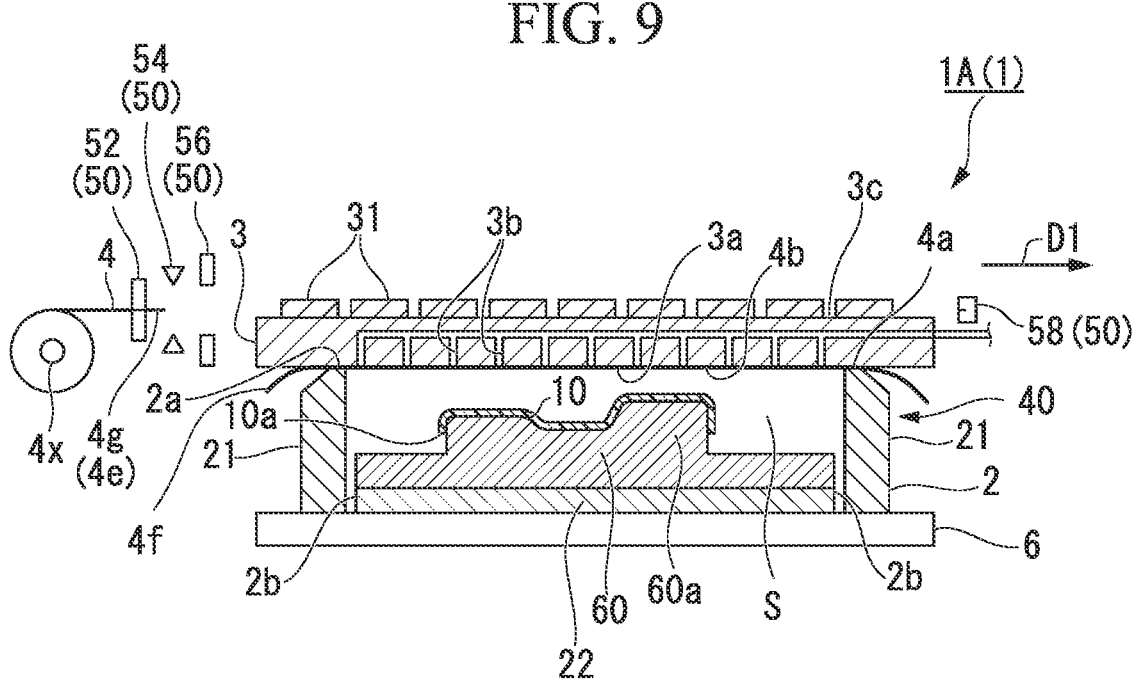
FIG. 9 is a longitudinal sectional view showing the thermoforming method in which the thermoforming device according to the first embodiment of the present invention is used.

FIG. 9 is a longitudinal sectional view showing a thermoforming method in which the thermoforming device 1A according to the first embodiment of the present invention is used, and shows a state where the hot plate 3 closely contact to the lower frame 2 with the sheet 4 interposed therebetween. Before the fifth step, as shown in FIG. 9, the closed space S surrounded by the hot plate 3 and the lower frame 2 of the substrate supply portion 40 is formed. In this state, the closed space S is sucked through the air holes 2b in a direction in which the sheet 4 moves to the lower side. As a result, air present in the accommodation space R on the lower side of the sheet 4 is sucked toward the base 22, and the closed space S is depressurized to be in a high vacuum state.

Next, while maintaining the depressurization operation of the closed space S, the suction operation of the sheet 4 is stopped such that the space between the hot plate 3 and the sheet 4 is exposed to the atmosphere or is pressurized toward the base 22 of the lower frame 2.

Specifically, the sheet 4 adsorbed on the hot plate 3 is heated to a predetermined temperature. Next, after a predetermined time, the suction operation of the air holes 3b of the hot plate 3 is stopped to stop the adsorption operation. As a result, the space between the hot plate 3 and the sheet 4 is exposed to the atmosphere, and a pressure difference is generated between a space above the sheet 4 and a space below the sheet 4.

Figure 10:
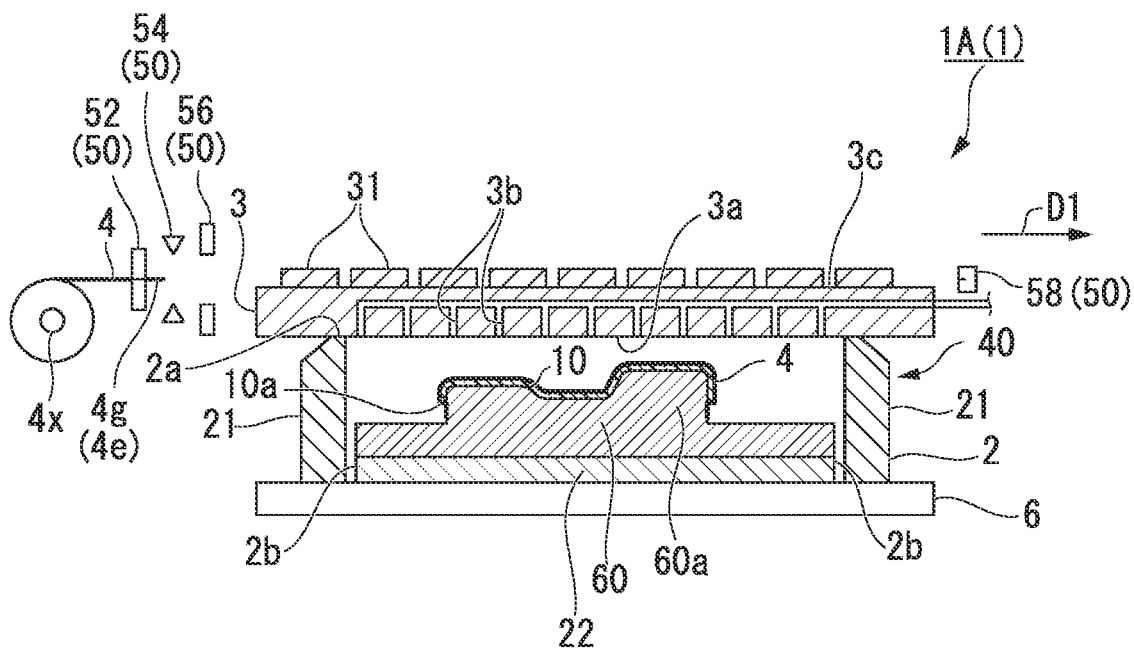
FIG. 10 is a longitudinal sectional view showing the thermoforming method in which the thermoforming device according to the first embodiment of the present invention is used.

FIG. 10 is a longitudinal sectional view showing a thermoforming method in which the thermoforming device 1A according to the first embodiment of the present invention is used, and shows a state where the sheet 4 covers a surface of the substrate 10.

As shown in FIG. 10, the sheet 4 which is heated and softened is separated from the heating surface 3a of the hot plate 3, moves toward the base 22 (the substrate 10 side) of the lower frame 2 positioned below the sheet 4, and is pressed toward a surface of the substrate 10. As a result, the sheet 4 covers the substrate 10 and is attached to the surface of the substrate 10.

When the space between the hot plate 3 and the sheet 4 is exposed to the atmosphere, the vacuum tank which is connected to each of the hot plate 3 and the sheet 4 may be switched to the pressure tank such that compressed air is jetted through the air holes 3b of the hot plate 3 to pressurize the inside of the closed space S.

Next, the compressed air at a preset pressure is introduced from the pressure tank (not shown) into the closed space S through the air holes 3b of the hot plate 3. The pressure (that is, the preset pressure) of the introduced compressed air is set to be sufficiently higher than the pressure when the space between the hot plate 3 and the sheet 4 is exposed to the atmosphere or is pressurized toward the base 22.

Once the compressed air at the preset pressure is introduced in to the closed space S as described above, the compressed air presses the sheet 4, which is positioned on the entire opening-side surface of the accommodation space R. As a result, the substrate 10 and the substrate jig 60 are pressed through the sheet 4.

Next, optionally, the sheet 4 may be trimmed.

<Sixth Step>

In this step, the substrate 10 covered with the sheet 4 is detached from the substrate jig 60.

Figure 11:
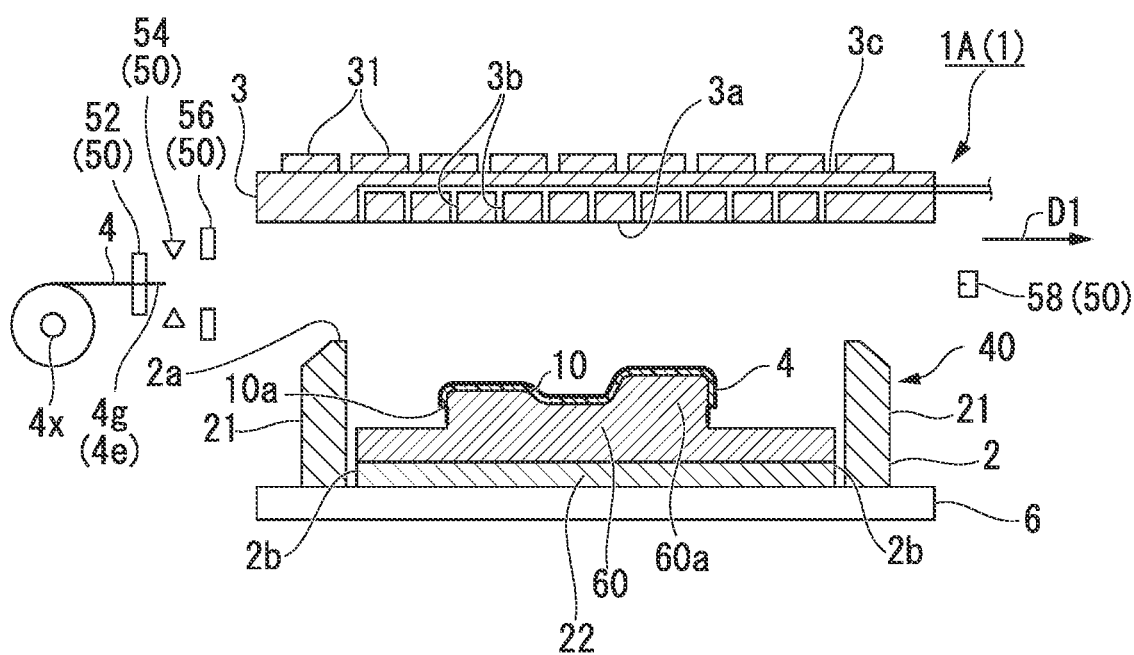
FIG. 11 is a longitudinal sectional view showing the thermoforming method in which the thermoforming device according to the first embodiment of the present invention is used.
Figure 12:
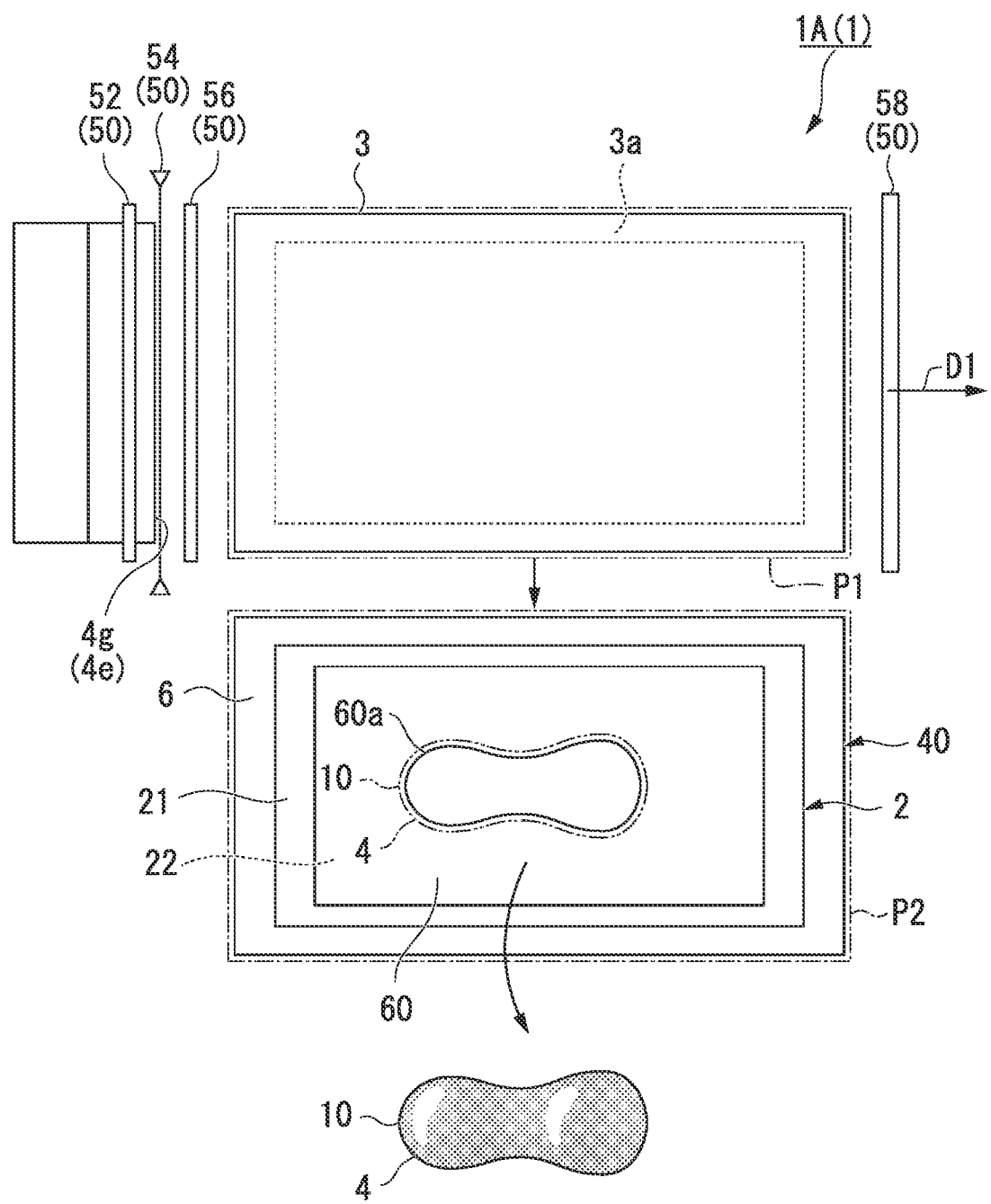
FIG. 12 is a plan view showing the thermoforming method in which the thermoforming device according to the first embodiment of the present invention is used.

FIGS. 11 and 12 are a longitudinal sectional view and a plan view, respectively, showing the thermoforming method in which the thermoforming device 1A is used, and show a state where the substrate 10 covered with the sheet 4 is moved from the substrate supply position P1 to the substrate non-supply position P2 and is detached from the substrate jig 60.

As shown in FIGS. 11 and 12, the hot plate 3 is moved to the upper side, and the lower frame 2 is moved in a horizontal direction in which the lower frame 2 moves away from the hot plate 3. This way, the substrate 10 and the base 22 are moved from the substrate supply position P1 to the substrate non-supply position P2 by the substrate supply portion 40. Then, the substrate 10 covered and attached with the sheet 4 is detached from the substrate jig 60.

In a case where a plurality of substrates 10, . . . , and 10 are covered with the sheet 4 and are continuously thermoformed, the second step may be started for the next thermoforming when the sixth step is performed.

Through the above-described operations, a formed product is achieved, and a series of forming operations are completed.

In a case where a plurality of substrates 10, . . . , and 10 are covered with the sheet 4 and are continuously thermoformed, the sheet end 4g which is supported by the support member of the sheet support portion 52 in the disposition shown in FIG. 12 may be replaced with the sheet end 4e, and then the first step to the sixth step described above may be sequentially performed.

[Effects of Thermoforming Device 1A and Thermoforming Method]

As described above, in the thermoforming device 1 according to the embodiment, while the sheet 4 which is supplied to the heating surface 3a of the hot plate 3 by the sheet transport portion 50 is heated, at least the attachment of the substrate 10 to (the detachment of the substrate 10 from) the substrate jig 60 which is provided on the base 22 is completed. In the thermoforming device 1A according to the embodiment, the attachment of the substrate 10 to the substrate jig 60 is performed at the substrate non-supply position P2. Therefore, as described above, while the sheet 4 is heated, the base 22 and the substrate 10 are disposed at the substrate supply position P1 by the substrate supply portion 40. Accordingly, the attachment of the substrate 10 to the base 22 and the heating of the sheet 4 are performed at the same time, and the heating time of the sheet 4 is included in the attachment time of the substrate 10 to the base 22. Thus, in the cycle time of thermoforming using the thermoforming device 1, it is not necessary to separately secure the heating time of the sheet 4, and thus the cycle time can be reduced.

In addition, in the thermoforming device 1A according to the embodiment, even in a case where the attachment of the substrate 10 to the substrate jig 60 which is provided in the base 22 is performed at the substrate non-supply position P2 as described above, the base 22 and the substrate 10 can be efficiently and smoothly moved to the substrate supply position P1 by the stand 6 of the substrate supply portion 40.

In addition, in the thermoforming device 1A according to the embodiment, the hot plate 3 can rise and fall relative to the substrate supply portion 40. As a result, the distance between the hot plate 3 and the substrate 10 in the vertical direction can be freely adjusted. Therefore, the attachment operation of the substrate 10 to the substrate jig 60 and the detachment operation of the substrate 10 from the substrate jig 60 can be efficiently performed.

In addition, in the thermoforming device 1A according to the embodiment, the sheet 4 is continuously supplied to the heating surface 3a of the hot plate 3 by the sheet transport portion 50. Therefore, the supply time of the sheet 4 can be reduced as compared to a case where the sheet 4 is supplied in a batch process. Thus, the cycle time can be reduced, and the effect can be further improved when the thermoforming is continuously performed.

In the thermoforming device 1A according to the embodiment, as a configuration where the sheet 4 is continuously supplied by the sheet transport portion 50, the roll sheet supported by the sheet support portion 52 is continuously unwound to a space between the hot plate 3 and the substrate supply position P1 by the sheet unwinding portion 58. In addition, the sheet 4 is cut by the sheet cutting portion 54 to have a predetermined length in the unwinding direction. During the cutting of the sheet 4, the sheet ends 4f and 4g of the cut roll sheet are held by the support member of the sheet support portion 52 and the cut sheet holding portion 56. According to the sheet transport portion 50 having the above-described configuration, the sheet 4 can be stably and continuously supplied without being removed from a predetermined position. Therefore, the continuous unwinding and cutting of the roll sheet can be performed, and the supply operation of the sheet 4 can be efficiently and smoothly performed.

According to the thermoforming method in which the thermoforming device 1 is used, while the sheet 4 which is supplied to the heating surface 3a of the hot plate 3 by the sheet transport portion 50 is heated, the attachment of the substrate 10 to the base 22 can be completed. Further, the base 22 and the substrate 10 can be disposed at the substrate supply position P1 by the substrate supply portion 40, irrespective of whether the attachment and position of the substrate 10 to the base 22 and the detachment position of the substrate 10 from the base 22 are the substrate supply position P1 or the substrate non-supply position P2. Thus, the heating time of the sheet 4 can be included in the attachment time of the substrate 10 to the base 22, and the cycle time can be reduced.

Second Embodiment

Figure 13:
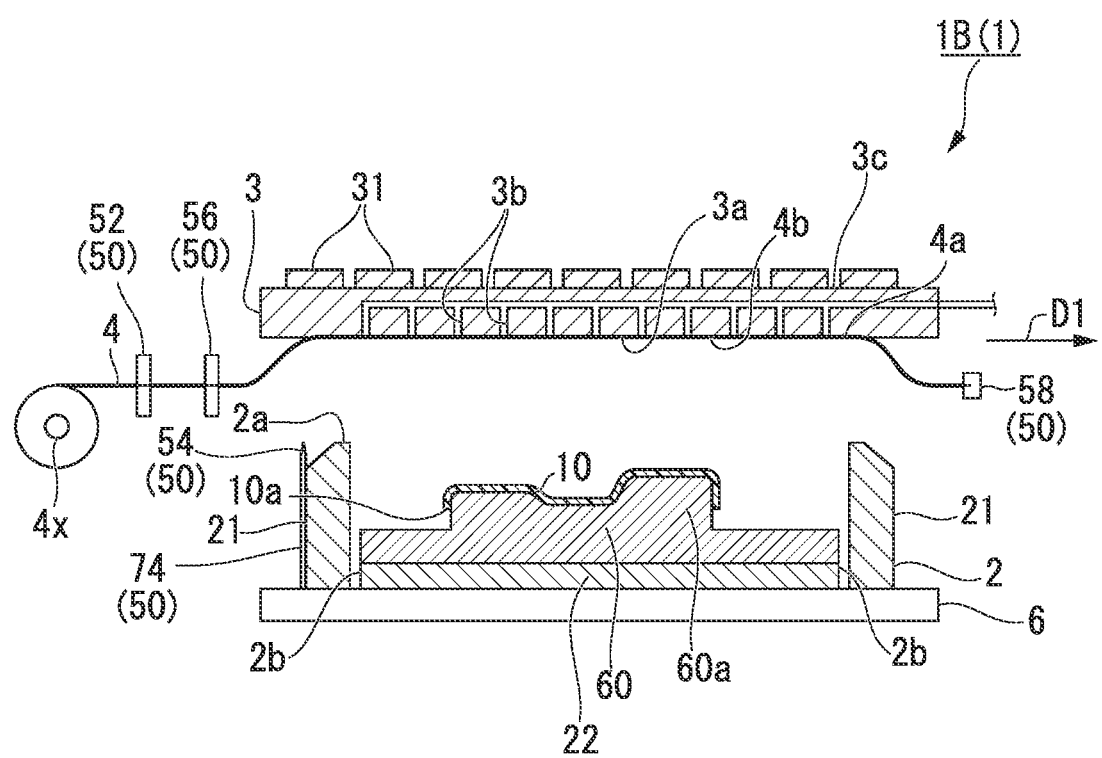
FIG. 13 is a longitudinal sectional view showing a configuration of a thermoforming device according to a second embodiment of the present invention.
Figure 14:
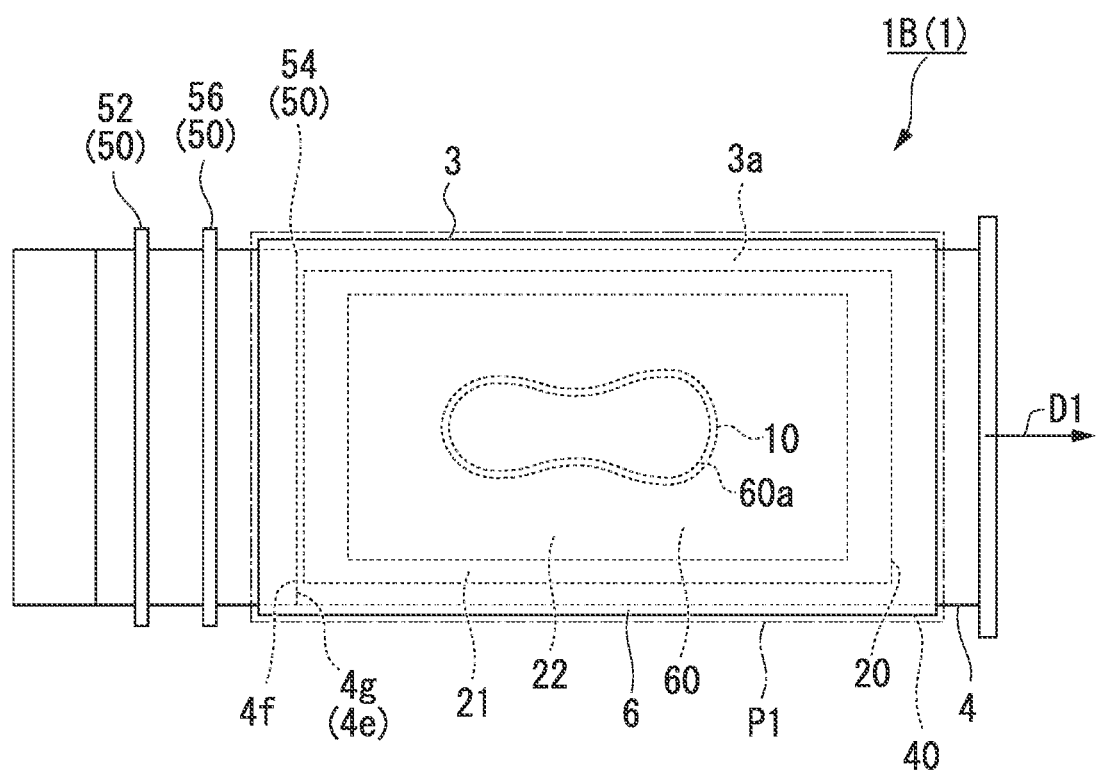
FIG. 14 is a plan view showing the configuration of the thermoforming device according to the second embodiment of the present invention.

Hereinafter, a thermoforming device according to a second embodiment of the present invention will be described.
[Configuration of Thermoforming Device 1B]
FIGS. 13 and 14 are a longitudinal sectional view and a plan view, respectively, showing a configuration of a thermoforming device 1B according to the second embodiment of the present invention.

Among components of the thermoforming device 1B shown in FIGS. 13 and 14, the same components as those of the thermoforming device 1A according to the first embodiment shown in FIGS. 1 and 2 will be represented by the same reference numerals, and the description thereof will not be repeated.

As shown in FIG. 13, the thermoforming device 1B includes the same components as those of the thermoforming device 1A. In the thermoforming device 1B, the position where the sheet cutting portion 54 of the sheet transport portion 50 is provided is different from that of the thermoforming device 1A.

The sheet cutting portion 54 is provided so as to contact to the outer peripheral surface of the peripheral wall portion 21 which is positioned at an upstream position in the unwinding direction D1 of the sheet 4 in the lower frame 2.

The sheet cutting portion 54 is a cutter which protrudes to the upper side, and a blade edge thereof can come into contact with an outer peripheral edge of a trimming region of the sheet 4. Specifically, the height of the blade edge of the sheet cutting portion 54 from the upper surface of the stand 6 is the same as the height of the frame upper edge portion 2a of the lower frame 2 from the upper surface of the stand 6. In addition, the distance between the blade edge of the sheet cutting portion 54 and the sheet 4 in the height direction can be finely adjusted by rising and falling means (not shown).

[Thermoforming Method in which Thermoforming Device 1B is Used]

Next, a thermoforming method in which the thermoforming device 1B is used will be described. As in the case of the thermoforming method according to the first embodiment, the thermoforming method in which the thermoforming device 1B according to the embodiment is used includes at least the first to fifth steps and may further include the sixth step. Therefore, the description of the same steps as those of the thermoforming method according to the first embodiment will not be repeated, and only different points from those of the thermoforming method according to the embodiment will be described.

<Fourth Step>

In the thermoforming method in which the thermoforming device 1B is used, as shown in FIG. 13, the hot plate 3 is moved to the lower side in a state where the sheet 4 is adsorbed on the heating surface 3a of the hot plate 3 and heated in the third step. Next, the outer peripheral portion of the heating surface 3a is disposed to closely contact to the frame upper edge portion 2a of the lower frame 2 with the sheet 4 interposed therebetween, and concurrently the blade edge of the sheet cutting portion 54 is brought into contact with the sheet 4 from the lower side. As a result, the sheet 4 which is unwound in advance is cut in a size which is enough to cover and to be attached to the substrate 10.

As shown in FIG. 14, the sheet end 4f is positioned at a downstream position of the cut sheet holding portion 56 in the unwinding direction. However, before cutting, the sheet 4 is adsorbed on the heating surface 3a of the hot plate 3 in advance. Therefore, the falling and removal of the sheet end 4f of the sheet 4 from the thermoforming device 1B or the adhesion of the sheet 4 to the stand 6 does not occur. In addition, the sheet end 4g is held by the cut sheet holding portion 56 and the support member of the sheet support portion 52. In this case, the cut sheet holding portion 56 is not necessarily provided.

[Effects of Thermoforming Device 1B and Thermoforming Method]

As described above, the thermoforming device 1B according to the embodiment includes the same components as those of the thermoforming device 1A according to the first embodiment. As a result, the same effects as those of the thermoforming device 1A according to the first embodiment can be obtained. In addition, in the thermoforming method in which the thermoforming device 1B is used, the same effects as those of the thermoforming method in which the thermoforming device 1A is used can be obtained. That is, in the cycle time of thermoforming, it is not necessary to separately secure the heating time of the sheet 4, and thus the cycle time can be reduced.

In addition, in the thermoforming device 1B according to the embodiment, the sheet 4 can be cut at the same time as when the hot plate 3 is disposed to closely contact to the frame upper edge portion 2a of the lower frame 2 with the sheet 4 interposed therebetween. Therefore, it is not necessary to separately secure the heating time of the sheet 4 during the cutting of the sheet 4, and thus the cycle time can be reduced.

Third Embodiment

Hereinafter, a thermoforming device according to a third embodiment of the present invention will be described.

[Configuration of Thermoforming Device 1C]

Figure 15:
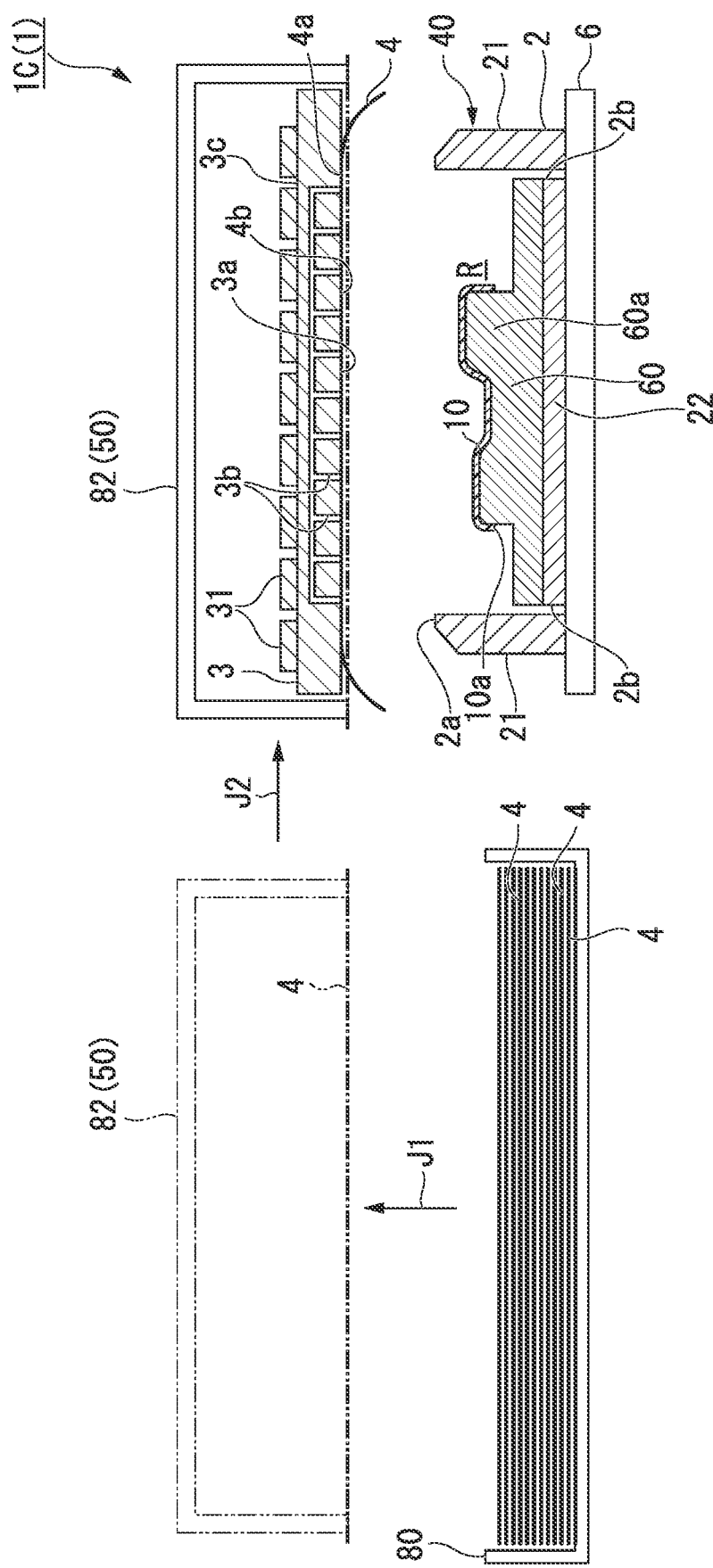
FIG. 15 is a longitudinal sectional view showing a configuration of a thermoforming device according to a third embodiment of the present invention.
Figure 16:
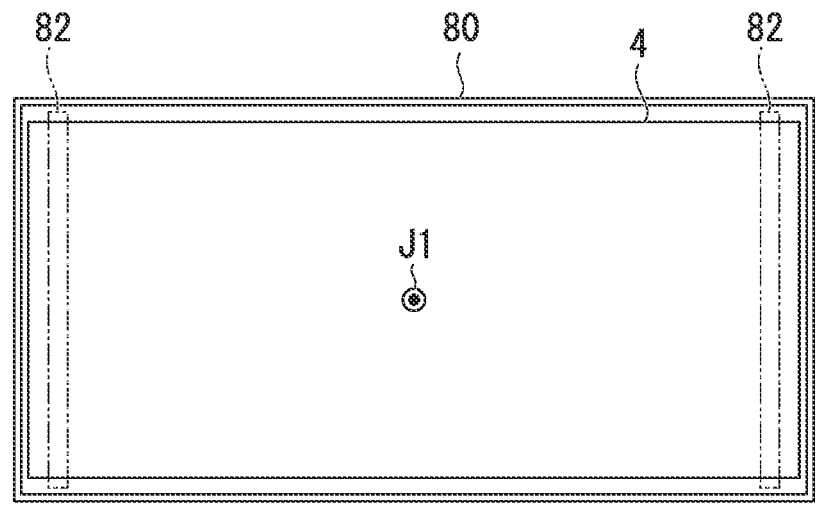
FIG. 16 is a plan view showing the configuration of the thermoforming device according to the third embodiment of the present invention.
Figure 16:
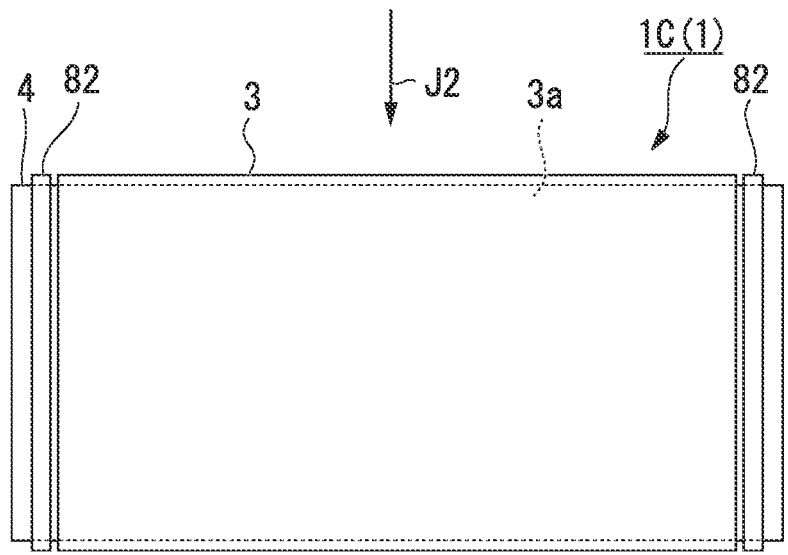
Figure 16:
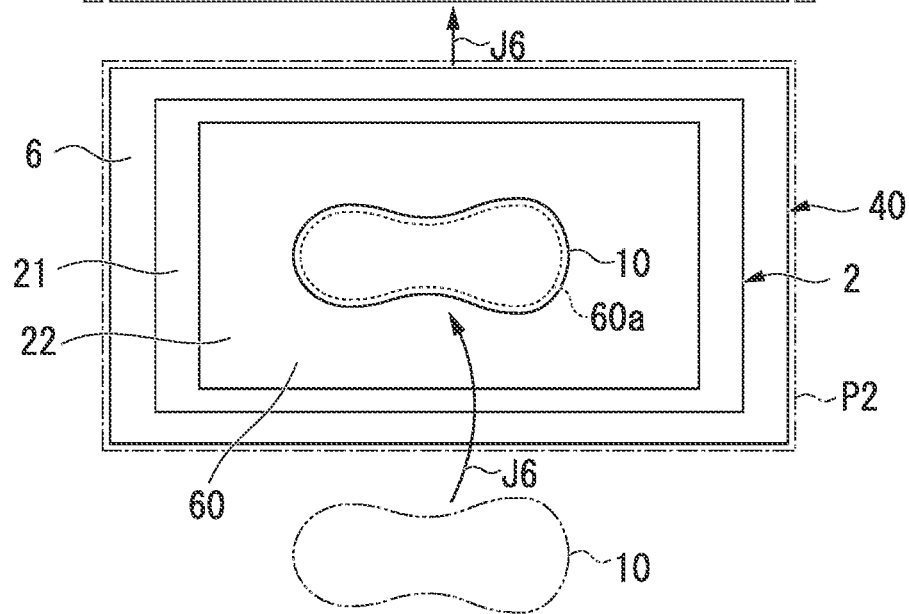

FIGS. 15 and 16 are a longitudinal sectional view and a plan view, respectively, showing a configuration of a thermoforming device 1C according to the third embodiment of the present invention.

Among components of the thermoforming device 1C shown in FIGS. 15 and 16, the same components as those of the thermoforming device 1A according to the first embodiment shown in FIGS. 1 and 2 will be represented by the same reference numerals, and the description thereof will not be repeated.

As shown in FIG. 15, the thermoforming device 1C includes a sheet storage portion 80 in addition to the same components as those of the thermoforming device 1A.

The sheet storage portion 80 is provided to store a plurality of sheets 4, . . . , and 4 which are cut in advance in a predetermined size, not in a form of the sheet 4 wound in a roll shape. Examples of the sheet storage portion 80 include a box with an open top surface. However, the sheet storage portion 80 is not particularly limited as long as it can store a plurality of sheets 4, . . . , and 4.

The sheet transport portion 50 of the thermoforming device 1C is provided in order to transport and supply a plurality of sheets 4, . . . , and 4, which are stored in the sheet storage portion 80, one by one along the extending direction of the heating surface 3a of the hot plate 3 (that is, the unwinding direction D1). Examples of the sheet transport portion 50 include an arm type member (hereinafter, referred to as "arm") 82 which does not interfere with the hot plate 3 when disposed immediately above the substrate supply position P1 (that is, a position which overlaps the rising position of the hot plate 3 when seen from the above). An air hole (not shown) is formed in a tip end portion of the arm 82, and a vacuum pump (not shown) is connected to this air hole. As a result, the sheet 4 can be sucked and adsorbed. That is, the arm 82 has functions of both the sheet support portion 52 and the cut sheet holding portion 56 in the thermoforming device 1A according to the first embodiment.

The configuration of the sheet transport portion 50 is not particularly limited as long as the above-described object can be achieved.

[Thermoforming Method in which Thermoforming Device 1C is Used]

Next, a thermoforming method in which the thermoforming device 1C is used will be described. As in the case of the thermoforming method according to the first embodiment, the thermoforming method in which the thermoforming device 1C according to the embodiment is used includes at least the first to fifth steps and may further include the sixth step. Therefore, the description of the same steps as those of the thermoforming method according to the first embodiment will not be repeated, and only different points from those of the thermoforming method according to the embodiment will be described.

<Second Step>

In this step, the arm 82 of the sheet transport portion 50 supplies the sheet 4 to a space between the heating surface 3a of the hot plate 3 and the substrate supply position P1.

Substantially at the same time as the start of the first step, the arm 82 is moved to, for example, a position immediately above the sheet storage portion 80 which is disposed at an upstream position of the heating surface 3a of the hot plate 3 in the unwinding direction. Next, as shown in FIGS. 15 and 16, the uppermost sheet 4 among the sheets 4, ..., and 4, which are stored in the sheet storage portion 80, is adsorbed on the tip end of the arm 82, and the arm 82 is moved to the upper side (direction indicated by arrow J1). Further, the arm 82 is moved along the unwinding direction D1 (direction indicated by arrow J2) of the heating surface 3a of the hot plate 3, and is disposed so as to surround the heating surface 3a of the hot plate 3. Once the movement of the arm 82 is completed, the sheet 4 is laid between the heating surface 3a of the hot plate 3 and the substrate supply position P1.

<Third Step>

In this step, the sheet 4 is heated by the hot plate 3 as in the case of the thermoforming method in which the thermoforming device 1A is used.

As shown in FIG. 16, the space between the hot plate 3 and the sheet 4 is depressurized, the sheet 4 is adsorbed on the heating surface 3a and heated. After the sheet 4 is adsorbed on the heating surface 3a, the adsorption of the sheet 4 on the tip end portion of the arm 82 is stopped.

Next, the rest operations are performed as described above regarding the thermoforming method in which the thermoforming device 1A is used.

[Effects of Thermoforming Device 1C and Thermoforming Method]

As described above, the thermoforming device 1C according to the embodiment includes the same components as those of the thermoforming device 1A according to the first embodiment. As a result, the same effects as those of the thermoforming device 1A according to the first embodiment can be obtained. In addition, in the thermoforming method in which the thermoforming device 1C is used, the same effects as those of the thermoforming method in which the thermoforming device 1A is used can be obtained. That is, in the cycle time of thermoforming, it is not necessary to separately secure the heating time of the sheet 4, and thus the cycle time can be reduced.

In addition, in the thermoforming device 1C according to the third embodiment, even in a case where the sheet 4 is cut in a predetermined size and is stored in the sheet storage portion 80 and these cut sheets 4, ..., and 4 are supplied one by one to the heating surface 3a of the hot plate 3, the sheets 4 are substantially automatically and sequentially supplied by the arm 82. Therefore, the supply operation of the sheet 4 using the sheet transport portion 50 can be efficiently and smoothly performed.

Hereinabove, the preferred embodiments of the present invention have been described in detail. However, the present invention is not limited to the specific embodiments, and various modifications can be made within the scope of the present invention described in the claims.

For example, in the thermoforming device 1 according to any one of the embodiments of the present invention, the lower frame 2 moves between the substrate supply position P1 and the substrate non-supply position P2 in the horizontal direction (for example, the direction indicated by arrow D3 in FIG. 6). However, the substrate supply position P1 and the substrate non-supply position P2 are not limited to the above-described position relationship. For example, the position of the substrate non-supply position P2 may be an appropriate position where the lower frame 2 is moved to the lower side from the substrate supply position P1 and where the substrate 10 is attachable to the base 22 and detachable from the base 22 in the lower frame 2. In this case, the lower frame 2 moves between the substrate supply position P1 and the substrate non-supply position P2 in the vertical direction.

The thermoforming device 1 and the thermoforming method according to any one of the embodiments of the present invention are applicable to both mold-shaping and covering-bonding.

In addition, the hot plate 3 is not limited to the description of the embodiments and the exemplary configurations shown in the drawings. For example, the hot plate 3 may include: a frame material that has an accommodation region of a substrate as a thermoforming target; a heating surface that has a square shape in a plan view; and a frame portion that protrudes from an outer peripheral edge to the frame material side and can come into contact with a frame edge portion of the frame material. In addition, in the hot plate, a vacuum hole which opens to the outer peripheral portion of the hot plate in a plan view may be provided at a corner portion of a frame portion on the heating surface.

DESCRIPTION OF REFERENCE SIGNS

1, 1A, 1B, 1C: THERMOFORMING DEVICE
3: HOT PLATE
3a: HEATING SURFACE
4: SHEET
10: SUBSTRATE
10a: BOTTOM SURFACE
22: BASE
40: SUBSTRATE SUPPLY PORTION
50: SHEET TRANSPORT PORTION
60: SUBSTRATE JIG
P1: SUBSTRATE SUPPLY POSITION
P2: SUBSTRATE NON-SUPPLY POSITION

The invention claimed is:

1. A thermoforming method in which a thermoforming device is used, the thermoforming device including:
   a base configured to hold a substrate,
   a hot plate including a heating surface facing vertically downward,
   a sheet transport portion that supplies a sheet from a core of the sheet onto the heating surface of the hot plate, wherein the sheet transport portion is between the core of the sheet and the hot plate and includes a sheet support portion, a sheet unwinding portion, a sheet cutting portion, and a cut sheet holding portion, and wherein the sheet cutting portion is between the sheet support portion and the cut sheet holding portion, and
   a substrate supply portion configured to attach the substrate to the base and detach the substrate from the base, and to dispose the substrate at a substrate supply position positioned in a lower area of the sheet which is opposite to a side of the sheet in which the heating surface is provided, and
   the method comprising:
   attaching the substrate to the base and disposing the base at the substrate supply position;
   unwinding the sheet from the core to an area between the heating surface of the hot plate and the substrate supply position by the sheet unwinding portion;
   heating the unwound sheet by the hot plate;
   moving the substrate supply portion to the substrate supply position;
   after moving the substrate supply portion to the substrate supply position, cutting the unwound sheet in a width direction of the sheet to separate the unwound sheet from the core of the sheet by the sheet cutting portion, wherein after cutting, a first sheet end is held by the cut sheet holding portion and a second, opposing sheet end is held by the sheet unwinding portion and a sheet end of the core of the sheet is held by the sheet support portion;

causing a frame, which accommodates the base and the substrate, to be relatively close to the hot plate and to come into contact with the hot plate through the sheet; and depressurizing the inside of a closed space enclosed by the sheet and the frame, and mold-shaping the sheet or attaching the sheet to the substrate;

wherein unwinding the sheet and heating the sheet occur in this order during attaching of the substrate to the base.

2. The thermoforming method of claim 1, wherein heating the sheet includes adsorbing the sheet onto the hot plate.

3. The thermoforming method of claim 1, wherein heating the sheet includes moving the sheet upward and into contact with the hot plate.

4. The thermoforming method of claim 3, wherein moving the sheet occurs before causing the frame to come into contact with the hot plate through the sheet.

5. The thermoforming method of claim 4, wherein the hot plate includes a plurality of air holes therethrough, and the hot plate is operatively coupled to a vacuum pump, and wherein moving the sheet includes operating the vacuum pump to suck air through the air holes.

6. The thermoforming method of claim 1, wherein cutting the unwound sheet is performed before causing the frame to come into contact with the hot plate through the sheet.

7. The thermoforming method of claim 1, wherein following cutting, opposing end portions of the cut sheet are not adsorbed on the hot plate.

* * * * *